United States Patent [19]
Hartman

[11] 3,861,108
[45] Jan. 21, 1975

[54] SLATTED FLOOR ASSEMBLY
[75] Inventor: Jack E. Hartman, Holland, Mich.
[73] Assignee: U.S. Industries, Inc., New York, N.Y.
[22] Filed: Apr. 18, 1973
[21] Appl. No.: 352,096

Related U.S. Application Data
[63] Continuation of Ser. No. 175,555, Aug. 27, 1971, abandoned.

[52] U.S. Cl.................... 52/667, 105/375, 119/28
[51] Int. Cl........................ E04c 2/42, E04f 19/10
[58] Field of Search........................... 52/667–669; 403/36; 15/215; 119/9, 28; 105/375

[56] References Cited
UNITED STATES PATENTS

| 861,882 | 7/1907 | Noppel | 219/28 |
|---|---|---|---|
| 894,711 | 7/1908 | Worcester | 52/669 |
| 1,620,846 | 3/1927 | Wells | 52/667 |
| 1,988,118 | 1/1935 | Green | 52/667 |
| 3,016,997 | 1/1962 | Price | 52/669 |
| 3,044,586 | 7/1962 | Cassels | 52/669 |
| 3,248,837 | 5/1966 | Newell et al. | 52/669 |
| 3,420,015 | 1/1969 | Costanzo | 52/669 |
| 3,438,167 | 4/1969 | Royston | 52/668 |
| 3,528,391 | 9/1970 | Johnston | 119/28 |
| 3,540,178 | 11/1970 | Altissimor | 52/669 |

Primary Examiner—Frank L. Abbott
Assistant Examiner—James L. Ridgill, Jr.
Attorney, Agent, or Firm—Price, Heneveld, Huizenga & Cooper

[57] ABSTRACT

A slatted floor is constructed by inserting a plurality of slat members into spacing means having apertures therethrough at predetermined spacing intervals along the length of the spacing means. The apertures are formed in the inverted U-shaped spacing means such that mounting flanges associated with the slat members slide into the apertures when the sidewalls of the spacing means are spread outwardly. As the ouward spreading force on the sidewalls is released, the edges of the apertures formed in the resilient sidewalls spring inwardly binding the mounting flanges of the slat members to securely hold the slat members in parallel relationship to each other and spaced from one another at the predetermined spacing interval.

6 Claims, 7 Drawing Figures

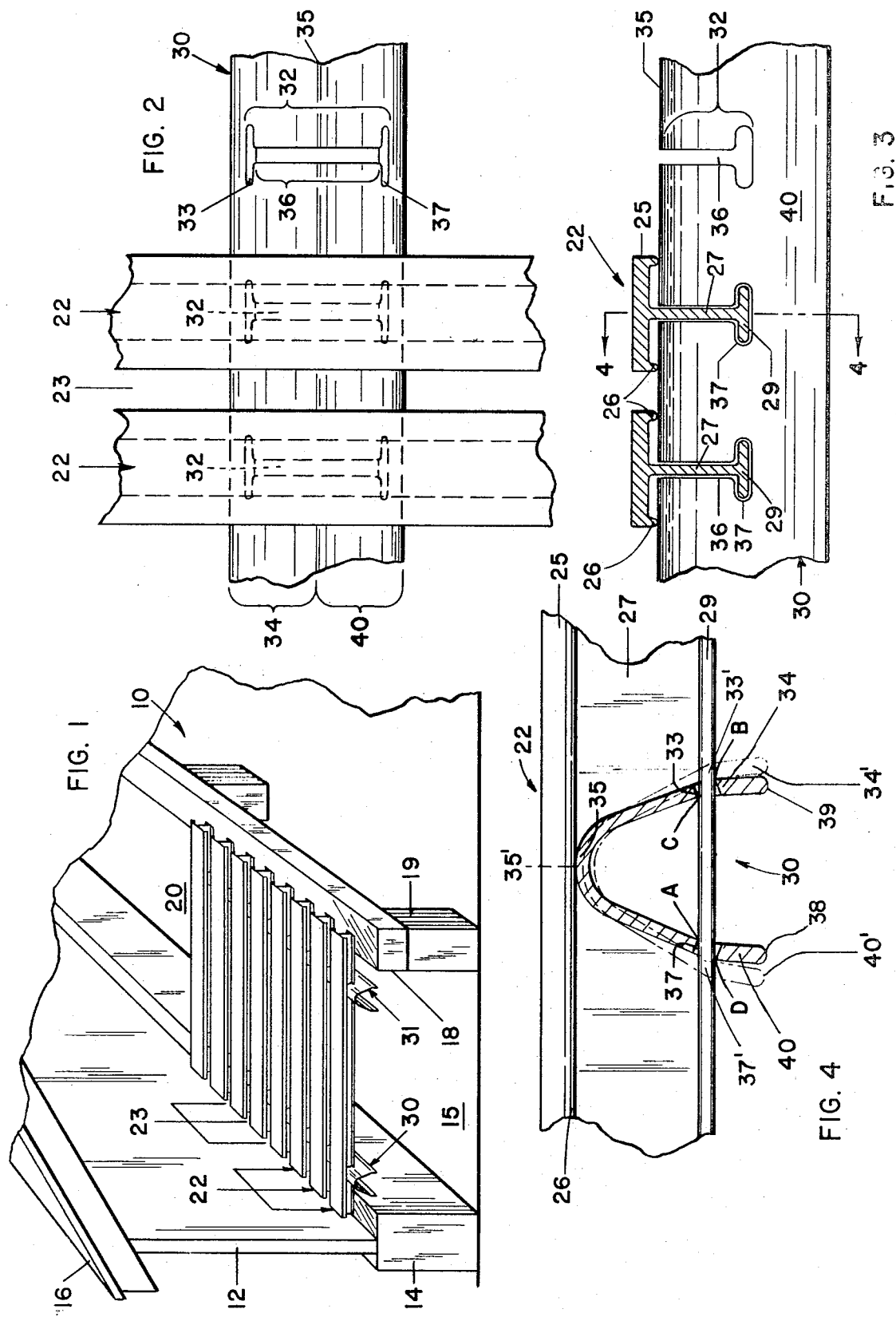

3,861,108

SLATTED FLOOR ASSEMBLY

This is a continuation of application Ser. No. 175,555, filed Aug. 27, 1971, now abandoned.

BACKGROUND OF THE INVENTION

The present invention relates to a slatted floor assembly suitable for use in an animal enclosure.

When animals such as hogs are housed in close quarters, the chore of maintaining the flooring relatively clean is a recurring and difficult problem. Slatted floors, which elevate the animals above the level of the ground and which provide spaces between the individual slat members through which animal waste and other debris can fall, have proven an effective solution to the cleaning problem as well as providing a more sanitary environment for the animals.

Slatted floors have been fabricated from a variety of materials such as wood, concrete, steel, etc. Recently a slatted floor system has been proposed in which slats in the form of extruded aluminum channels are fastened to spacing and connecting clips by means of a small flange member on the channel. This system has some of the advantages inherent in aluminum structures i.e., it is lightweight and the installation costs as compared to conventional wood or concrete slatted floors is reduced. The connecting clips used to hold and space the slats, however, contact only a relatively small area of the channeled slat members and, during continued use, the slats may loosen and the connecting clips may fatigue as the slats flex with the shifting weight of the animals. The present floor assembly, however, employs spacing means which are fabricated from extruded aluminum channels and provides an improved holding surface for locking slats into place.

SUMMARY OF THE INVENTION

Systems embodying the present invention include spacing means comprising inverted U-shaped channels having apertures through which flange members associated with a plurality of parallel floor slat members are rigidly affixed. The slat members can be easily installed or removed from the spacing means without the use of special tools by spreading the resilient sidewalls of the U-shaped spacing means thereby allowing free movement of the slat mounting flanges into the correspondingly shaped apertures.

It is therefore an object of the present invention to provide an improved slatted floor assembly in which spacing means rigidly hold individual slats thereby preventing movement of the slats during use which otherwise may cause rattling of the slats or fatigue of the spacing means.

It is a further object of the present invention to provide a novel slatted floor assembly having composite parts manufactured of extruded aluminum which is lightweight, strong, relatively inexpensive and can be easily installed without the need of special installation tools.

The novel features that are characteristic of the invention are set forth with particularity in the appended claims. The operation of the preferred embodiment of the invention will best be understood by referring to the figures and description thereof in which:

DESCRIPTION OF THE DRAWINGS

FIG. 1 is a cutaway, perspective view of a portion of an animal enclosure including a slatted floor embodying the present invention;

FIG. 2 is a plan view of a portion of a spacing channel member showing the apertures formed therein which accept the slat members. Also shown in FIG. 2 is a portion of two slat members and their position relative to the spacing member and to each other;

FIG. 3 is a front view of the structure shown in FIG. 2;

FIG. 4 is an enlarged sectional view of the structure shown in FIG. 3 taken along the section line 4—4. The solid line portion of the figure shows the location of a slat relative to the spacing member after installation. The dotted segment of FIG. 4 shows the position of the spacing member when spread apart during installation of the slat;

DESCRIPTION OF THE PREFERRED EMBODIMENT

Figure 5:
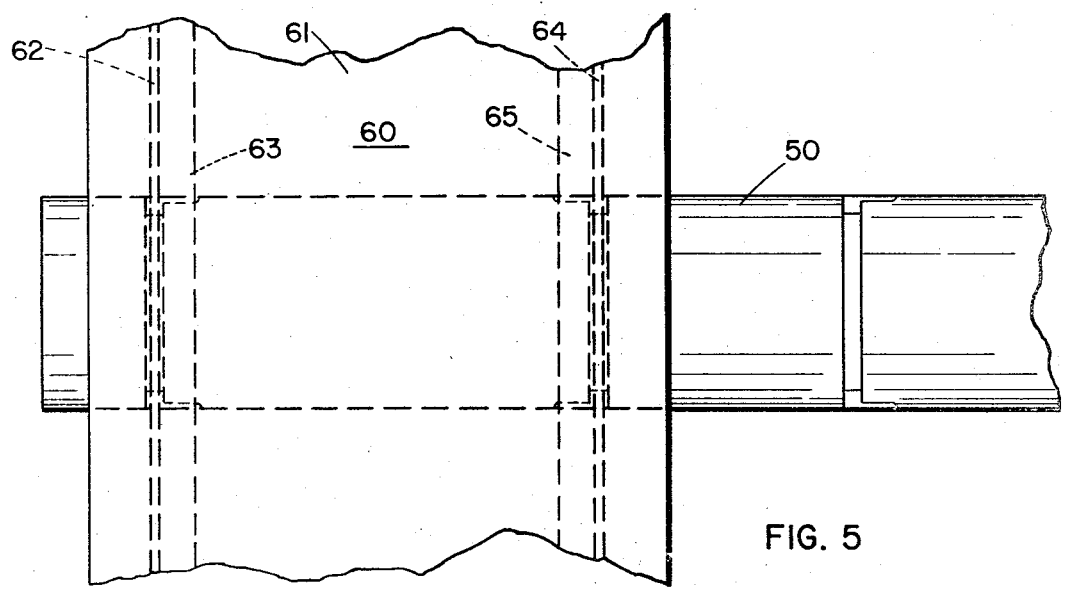
FIG. 5 shows an alternate embodiment of the present invention in which a plan view of the slat member and spacing member is shown.

In FIG. 1 an animal enclosure 10 includes a wall 12 setting on a foundation member 14 which rests on the ground. Although the view shows only a portion of wall 12, it is understood that the enclosure is a four-walled structure having suitable access and egress means for the animals. The enclosure 10 may also include a roof structure 16. A slatted floor assembly 20 is constructed from a plurality of slat members 22 held in spaced relationships by means of spacing members 30 and 31. The floor assembly 20 rests between the foundation 14 and a support beam 18 held in place by a stanchion 19 at one end of the enclosure 10. The slat members 22 are held in parallel relationship to one another by the means 30, 31 such that a uniform space 23 of predetermined width exists between individual slat members 22. The width of space 23 is selected such that waste material from the animals or other debris can pass through the space and fall into a receptacle pit 15 located under the slatted floor. As the animals move over slat members 22 they will trample the waste material through the spaces 23 and into pit 15 thereby maintaining a relatively clean floor area. The pit 15 can be cleaned out by scraper blades or flushed with water occasionally. If water is used it is understood that the enclosure includes suitable drainage means to facilitate cleaning.

The entire floor area of enclosure 10 can be covered with several individual sections of slatted floor assemblies 20 each of which can be easily removed for repair or thorough cleaning from time to time. In some applications where slat members 22 are relatively long, it may be necessary to include additional spacing means (identical to spacing means 30, 31) between means 30 and 31 to give additional support to slat members 22. The detailed construction of slat members 22 and spacing means 30 (identical to spacing means 31) is shown in FIGS. 2–4.

FIG. 2 is a plan view of a portion of slats 22 which are securely fitted into apertures 32 formed in the spacing means 30 to provide a space 23 between slats 22. Each aperture 32 includes a vertical slot portion 36, and horizontal slot portions 33 and 37 as illustrated on the aperture to the left side of spacing means 30 in FIG. 2. As shown in FIG. 1 and subsequently in FIG. 4, the spacing means are fabricated from inverted U-shaped channels having two walls 34, 36 converging at the apex 35 of the channel 30. The slot 33 of aperture 32 is formed in the wall 34 of the member 30 while slot 37 is formed in the wall 40. Slot 36 will span across the apex 35 of the channel 30 to connect slots 33 and 37 as illustrated in FIG. 2. Spacing channel 30 can be formed from desired lengths of extruded aluminum through which the apertures can be formed by a suitable machinery process such as stamping.

FIG. 3 is a front view of the structure shown in FIG. 2 and an end view of slats 22 and a side view of a portion of a spacing means 30. In the figure the cross-section of slats 22 appears as being generally T-shaped, the upper surface of which serves as the floor of the slatted floor assembly. The under surface of each slat 22 includes downwardly depending edges 26 (FIG. 3). An upright portion 27 of slat 22 connects the top bar 25 to a base member 29 of slat 22. The upright portion 27 and base member 29 combine to form a mounting flange for the floor slat 22. The upright portion 27 of slat 22 passes through the vertical slot portion 36 of aperture 32 while the base member 29 of slat 22 passes through horizontal slots 37 and 33 (33 not shown in FIG. 3) of spacing member 30 when the U-shaped channel is spread. In FIG. 3 the apertures 32 appear as inverted T-shaped slots through member 30. The slot members, like the channel spacing members, can be fabricated from extruded aluminum. FIG. 4 is an enlarged end view of FIG. 3 taken along the view line 4—4 shown in FIG. 3, and illustrates graphically and in exaggerated form for clarity, the manner in which spacing member 30 securely holds slat 22 into position.

In FIG. 4 the spacing member (channel member 30' in the figure) is illustrated in dashed lines in the spread position during the installation of a slat. The same channel member is represented by the numeral 30 and shown in solid lines when it is in the released position with the slat installed. In the figure the resilient sidewalls 34' and 40' of the U-shaped channel member 30' are spread outwardly such that the base member 29 of the slat 22 will pass easily through both slots 33' and 37' in the channel member 30'. When the slat 22 is located at the desired position relative to the channel member 30', the outward spreading force applied to walls 34' and 40' is released. The resilient U-shaped channel then will attempt to spring back to the original shape but is prevented from doing so by the insertion of slat 22. As the walls 34' and 40' move inwardly, the wall portions immediately adjacent slots 33' and 37' of channel member 30' contact the base member 29 of slat 22 at points A, B, C and D of slots 33 and 37 respectively as shown in the solid line portion of the diagram. Also the apex 35 of spacing member 30 contacts the under side of the slats 22 at the edge portions 26 (FIGS. 3 and 4). Since the spacing member 30 has not completely returned to its original state, the existant spring tension of spacing member 30 will apply a compressive holding force between points A and C of the base member 29 of slat 22 and the edges 26 of the top bar 25 thereby securely holding the slat into a locked position.

In another embodiment the apertures in the spacing members were dimensioned such that the slats could be installed only when the resilient sides of the spacing members were inwardly compressed. When the compressive force is released, the sides of the spacing member spring outwardly such that the slat is held in place only by the contact of the base member 29 at points A, B, C and D with the aperture in the spacing member. Another embodiment of the present invention is shown in FIGS. 5 and 6.

Figure 6:
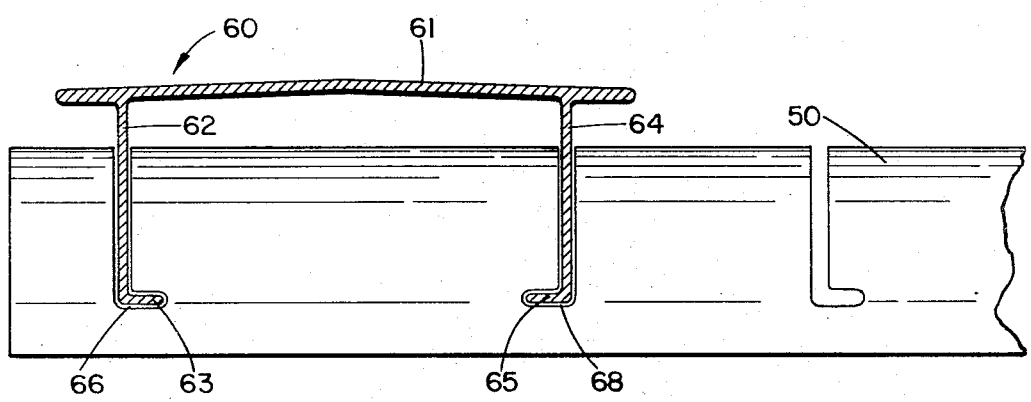
FIG. 6 is a side elevational view of the slat member and spacing member.

Referring to FIGS. 5 and 6, a slat member 60 having a horizontal base member 61 and vertical legs 62 and 64 with inwardly pointing locking flanges 63 and 65, respectively, is fitted into apertures 66 and 68 in the spacing member 50 by compressing the spacing member. As the spacing member 50 is compressed, the vertical leg portions 62 and 64 of slat 60 are fitted into position. When the compressed sides of spacing member 50 are released, the spring tension on flange members 63 and 65 securely holds channel member 60 in position. To further insure adequate locking in some installations it may be desired to swage the spacing member 50 at the aperture 68 adjacent the flanges 63 and 65.

Figure 7:
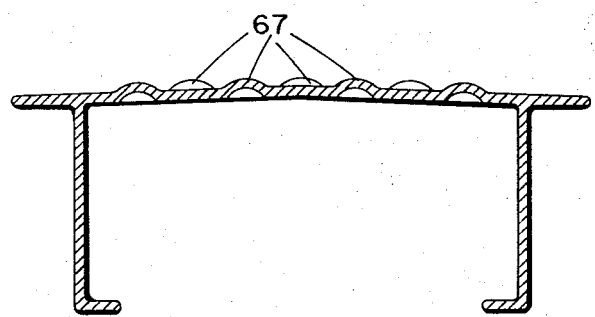
FIG. 7 is an end view of an alternative embodiment of the slat member shown in FIGS. 5 and 6.

FIG. 7 illustrates a slat member similar in shape to the slat 60 shown in FIGS. 5 and 6 with the addition of dimples 67 which can be formed on the horizontal base member by a stamping process and which provide a non-skid surface for the flooring formed by the slats.

The embodiments of the invention in which an exclusive property or privilege is claimed are defined as follows:

1. A slatted floor assembly including means for securely holding parallel flooring slats at predetermined spaced intervals, said assembly comprising:

a plurality of flooring slats each having an elongated, narrow, supporting member the upper surface of which defines the supporting floor formed by the assembly and a downwardly depending mounting flange, said mounting flange comprising an upright leg joined to and extending along said supporting member at a lower surface thereof and a base segment extending transverse to said leg and coupled to said leg at an end of said leg remote from said supporting member; and spacing means for securing said slats at predetermined, spaced intervals with respect to each other, said spacing means comprising a plurality of spaced channel members each having resilient side walls which include a plurality of apertures formed therethrough, said apertures spaced at predetermined intervals along the longitudinal dimension of said walls and shaped to allow said flooring slat mounting flange to be inserted through aligned apertures of adjacent channel members orthogonal to the longitudinal axis of said channel members when said resilient side walls are resiliently deflected, said side walls including a wall portion immediately adjacent said apertures which engages said mounting flanges of said slats and said lower surface of said supporting member to securely hold said flooring slats in said channel members when said walls are released.

2. A slatted floor assembly including means for securely holding parallel flooring slats at predetermined spaced intervals, said assembly comprising:

a plurality of flooring slats each of which includes a mounting flange extending the length of said slat and downwardly therefrom; and a plurality of longitudinally extending channel spacing means spaced from one another and positioned orthogonally of said flooring slats, each channel spacing means having resilient side walls normally located in a first relative position wherein the side walls are not flexed, said side walls being flexibly movable from said first relative position to a second relative position in which the side walls are flexibly stressed, said side walls including a plurality of aligned apertures formed therethrough and spaced at predetermined intervals along the longitudinal dimension of said walls, said aligned apertures being located one in each of said side walls opposite each other and in the said second relative position of said side walls providing a passageway therethrough of proper shape and size for receiving said mounting flanges of said flooring slats and in said first relative position of said side walls providing a passageway therethrough of insufficient size and shape to receive said mounting flanges whereby said mounting flanges associated with said flooring slats can be inserted through said apertures of said channel means only when said resilient side walls are in said second relative position and upon being released said side walls flex toward said first relative position causing wall portions of said side walls immediately adjacent said apertures to securely hold said flooring slats in said channel spacing means.

3. An assembly as defined in claim 2 wherein each of said channel spacing means comprises an inverted U-shaped channel member fabricated of extruded aluminum.

4. An assembly as defined in claim 2 wherein said apertures in each of said resilient side walls of said channel spacing means substantially conform in shape to said mounting flanges associated with said flooring slats.

5. An assembly as defined in claim 2 wherein each of said flooring slats comprises:
- an elongated substantially flat top member having downwardly depending edges;
- an upright portion having one end orthogonally mounted to said top member at a center line of said top member, said upright portion running the length of said top member; and
- an elongated, substantially flat base member orthogonally mounted at a center line of said base member to an end of said upright portion remote from its mounting to said top member wherein said upright portion and said base member define a mounting flange.

6. An assembly as defined in claim 5 wherein said apertures in said channel members include a vertical slot shaped to receive said upright portion of said flooring slat, and a horizontal slot in each of said side walls communicating with said vertical slot, said horizontal slots shaped to receive said base member of said flooring slat and wherein said vertical slot extends from said horizontal slot in one of said side walls to said horizontal slot in the other of said side walls.

* * * * *